J. MURPHY.
Mandrel used in the Manufacture of Rubber Hose.
No. 198,497. Patented Dec. 25, 1877.
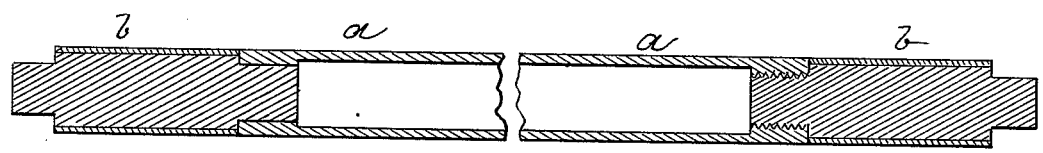

UNITED STATES PATENT OFFICE.

JOHN MURPHY, OF BROOKLYN, ASSIGNOR TO THE GUTTA PERCHA AND RUBBER MANUFACTURING COMPANY, OF NEW YORK, N. Y.

IMPROVEMENT IN MANDRELS USED IN THE MANUFACTURE OF RUBBER HOSE.

Specification forming part of Letters Patent No. 198,497, dated December 25, 1877; application filed December 7, 1877.

*To all whom it may concern:*

Be it known that I, JOHN MURPHY, of Brooklyn, county of Kings, State of New York, have invented an Improvement in the Construction of Mandrels, such as are used in manufacturing india-rubber hose, of which the following is a specification:

India-rubber hose is made of strips of cloth coated with rubber on both sidest. The strips, being cut to the proper width for either two, three, or more ply hose, are wrapped around an iron mandrel of the same outside diameter as the interior of the hose is intended to be, and the so made hose is then submitted to steam-heat while on its mandrel, in order to cure or vulcanize its rubber coating.

Heretofore these mandrels have been made throughout their whole length of ordinary wrought-iron pipe. Such mandrels corrode at their ends in a very short time when being used, as the steam in the heater will get in between the hose and the mandrel to the extent of about two feet from the ends, thereby generating sulphurous acid from the sulphur contained in the rubber gum of the hose, which, acting on the ends of the mandrel, will eat into the surface and spoil those portions of the mandrel, and when the ends of the mandrel are thus indented by corrosion they are unfit to make good hose.

In order to obviate this difficulty, and construct a mandrel which will remain in good condition for an indefinite time, I make the ends of the mandrel of such metals, or coat their surfaces with such metal or other material, as will resist corrosion, such as brass, copper, &c., as it would be too expensive to make the whole mandrel of such materials.

The drawing represents a longitudinal section of a mandrel constructed according to my plan.

Letter $a$ refers to the main or central portion of the mandrel, which consists of common iron pipe, it not being liable to corrode. At each of its ends it is jointed to an extension, $b\ b$, each about two feet in length, and coated around its cylindrical surface with a material that would not corrode under the conditions involved in the manufacture of hose, such as brass, copper, &c. The bodies of these extensions are shown in the drawings solid; but they may be made of tubing, and they may be jointed to the main portion of the mandrel $a$ either permanently or so as to be separable therefrom.

What I claim as my invention is—

A mandrel for the manufacture of rubber hose, which consists, in its main or central portion, of ordinary iron pipe, and its ends either wholly of brass, copper, or other material not liable to corrode, or only coated with such material, substantially as specified.

JOHN MURPHY.

Witnesses:
ALBERT H. HOOK,
TERENCE J. MORRIS.